US012366626B2

(12) United States Patent
Khider et al.

(10) Patent No.: US 12,366,626 B2
(45) Date of Patent: Jul. 22, 2025

(54) CLIENT-SERVER APPROACH FOR INDOOR-OUTDOOR DETECTION OF AN ELECTRONIC DEVICE, AND ASSOCIATED SYSTEMS AND METHODS

(71) Applicant: Google LLC, Mountain View, CA (US)

(72) Inventors: Mohammed Khider, Mountain View, CA (US); Luigi Bruno, San Jose, CA (US); Wei Wang, San Carlos, CA (US)

(73) Assignee: Google LLC, Mountain View, CA (US)

( * ) Notice: Subject to any disclaimer, the term of this patent is extended or adjusted under 35 U.S.C. 154(b) by 353 days.

(21) Appl. No.: 18/040,743

(22) PCT Filed: Aug. 18, 2020

(86) PCT No.: PCT/US2020/046760
§ 371 (c)(1),
(2) Date: Feb. 6, 2023

(87) PCT Pub. No.: WO2022/039721
PCT Pub. Date: Feb. 24, 2022

(65) Prior Publication Data
US 2023/0324499 A1  Oct. 12, 2023

(51) Int. Cl.
*G01S 5/00* (2006.01)
*G01S 5/02* (2010.01)
*H04W 64/00* (2009.01)

(52) U.S. Cl.
CPC ............ *G01S 5/012* (2020.05); *G01S 5/0036* (2013.01); *G01S 5/0063* (2013.01);
(Continued)

(58) Field of Classification Search
CPC ..... G01S 5/012; G01S 5/02529; G01S 5/0242
(Continued)

(56) References Cited

U.S. PATENT DOCUMENTS 8,660,577 B2   2/2014 Ledlie
10,423,926 B1 * 9/2019 Nagpal ................... H04W 4/38
(Continued)

FOREIGN PATENT DOCUMENTS

CN   106980131 A   7/2017
JP   2003087361 A   3/2003
(Continued)

OTHER PUBLICATIONS

Wang et al., "Indoor-Outdoor Detection Using a Smart Phone Sensor," Sensors, 2016, 15 pages, vol. 16, No. 1563.

*Primary Examiner* — Harry K Liu
(74) *Attorney, Agent, or Firm* — McDonnell Boehnen Hulbert & Berghoff LLP

(57) ABSTRACT

This document describes a client-server approach for indoor-outdoor detection of an electronic device, and associated systems and methods. A server (104) collects crowd-sourced information (140) from devices that detected a plurality of access points. An electronic device (102), performing a wire-less-network scan, detects access points (122) within range and detects sensor data (126) from other sensors (124). The electronic device (102) transmits such information to the server (104). The server accesses the crowdsourced information (140) to determine, per access point (122) detected in the scan, a percentage of total detections of the access point that are accompanied by a GPS signal of a device that detected the access point and an RSS value below which no such GPS signal accompanies the detections. The percentage and the RSS value enable a determination of a probability indicating whether the electronic device (102) is located outdoors, lightly indoors, or deep indoors, which enables the electronic device to trigger a corresponding function.

15 Claims, 5 Drawing Sheets

(52) U.S. Cl.
   CPC ........ *G01S 5/0242* (2013.01); *G01S 5/02529* (2020.05); *G01S 2205/02* (2020.05); *H04W 64/006* (2013.01)

(58) Field of Classification Search
   USPC ........................................................ 342/451
   See application file for complete search history.

(56) References Cited

U.S. PATENT DOCUMENTS

| | | |
|---|---|---|
| 10,440,518 B2 | 10/2019 | Kim et al. |
| 2015/0057018 A1 | 2/2015 | Moeglein |
| 2015/0097731 A1* | 4/2015 | Russell .................... G01S 5/012 342/450 |
| 2015/0334678 A1* | 11/2015 | MacGougan ............ H04W 4/02 701/451 |
| 2020/0015047 A1* | 1/2020 | Song ..................... H04W 4/026 |
| 2020/0019580 A1* | 1/2020 | Kim .................... G06F 16/9537 |

FOREIGN PATENT DOCUMENTS

| | | | |
|---|---|---|---|
| JP | 2012103223 A | 5/2012 | |
| JP | 2018141721 A | 9/2018 | |
| JP | 2019132627 A | 8/2019 | |

\* cited by examiner

CLIENT-SERVER APPROACH FOR INDOOR-OUTDOOR DETECTION OF AN ELECTRONIC DEVICE, AND ASSOCIATED SYSTEMS AND METHODS

CROSS-REFERENCE TO RELATED APPLICATIONS

The present application is a national stage application under 35 U.S.C. § 371 of International Application No. PCT/US2020/046760, filed Aug. 18, 2020, and titled "Client-Server Approach for Indoor-Outdoor Detection of an Electronic Device, and Associated Systems and Methods," which is incorporated herein by reference in its entirety.

BACKGROUND

Many users carry electronic devices (e.g., smartphones) practically everywhere they go. These devices can perform a variety of functions based on information corresponding to the device's location. Certain functions, however, may continually or frequently search or scan for signals, even when unnecessary, which consumes precious battery power. For example, Global Positioning System (GPS) signals may be weak (or not detectable) when the device is inside a building, due to interference by the building itself. Continuing to use GPS detection when the GPS signals are weak or not detectable may result in unreliable GPS data for some applications and unnecessary power consumption, particularly when other sources of location data may be more accurate than GPS in an indoor environment.

Another challenge may occur when a user enters or exits a building while using a mixed-reality application. For example, some such applications may operate in a three-dimensional (3D) mode outdoors, showing "street-views" of virtual-building images for visual navigation but when the user enters a building, these applications may erroneously continue to show such "street-views" rather than views corresponding to the inside of the building. The opposite may occur when the user exits the building and the mixed-reality application continues to show indoor views of the building while the user and the device are outside of the building. These situations can result in a poor user experience.

Accordingly, there exists a challenge in determining whether an electronic device is indoors or outdoors.

SUMMARY

This document describes a client-server approach for indoor-outdoor detection of an electronic device, and associated systems and methods. The server collects crowdsourced information (e.g., raw signals) from devices that detected a plurality of access points. An electronic device, performing a wireless-network scan, detects access points within range and detects signals from other sensors. The electronic device transmits such information to the server. The server accesses the crowdsourced signals to determine, per access point detected in the scan, (i) a percentage of total detections of the access point that are accompanied by a GPS signal of a device that detected the access point, and (ii) a received signal strength (RSS) value below which no such GPS signal accompanies the detections. The percentage and the RSS value enable a determination of a probability of the location of the electronic device being within a certain category (such as indoors or outdoors). For example, the percentage and RSS value may enable a determination of a probability indicating whether the electronic device is located outdoors or indoors, and if indoors, whether the electronic device is lightly indoors or deep indoors. The probability may enable the electronic device to trigger a corresponding function.

In one aspect, a method, performed by a server, for indoor-outdoor detection of an electronic device is disclosed. The method includes receiving a request from an electronic device for location information corresponding to access points detected in range of the electronic device and identified in the request. The request includes sensor data detected by the electronic device at a location of the electronic device. The method also includes accessing, in response to receiving the request, stored crowdsourced signals, including access-point detections and corresponding sensor data previously received from a plurality of electronic devices that observed a plurality of access points. The accessing is to locate a subset of the stored crowdsourced signals that correspond to the access points identified in the request. In addition, the method includes determining, based on the stored crowdsourced signals and per access point identified in the request, a percentage of detections of the access point that are accompanied by a global positioning system, GPS, signal of a device that detected the access point. Further, the method includes determining, based on the stored crowdsourced signals and per access point identified in the request, a received signal strength, RSS, value below which no GPS signal accompanies the detections of the access point. The method also includes transmitting the percentage and the RSS value, per access point identified in the request, to the electronic device to enable the electronic device to determine if the location of the electronic device is an outdoor location or an indoor location and trigger a corresponding function.

In other aspects, a method, performed by an electronic device, for indoor-outdoor detection of the electronic device is disclosed. The method includes performing a scan for wireless networks in range of the electronic device, detecting a plurality of location-related signals using sensors of the electronic device, and transmitting the plurality of location-related signals and a list of the identified access points to a server. The method also includes receiving, from the server, information corresponding to each of the identified access points. The received information corresponds to crowdsourced signals collected at the server from a plurality of electronic devices that observed the identified access points. Also, the received information includes an indication of a percentage of detections of a respective identified access point in the crowdsourced signals that are accompanied by a GPS signal and a received signal strength (RSS) value below which the detections of the respective identified access point are not accompanied by a GPS signal.

This summary is provided to introduce simplified concepts concerning a client-server approach for indoor-outdoor detection of an electronic device, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a client-server approach for indoor-outdoor detection of an electronic device, and associated systems and methods, are described in this document with reference to the following drawings.

The same numbers are used throughout the drawings to reference like features and components.

DETAILED DESCRIPTION

Overview

Figure 1:
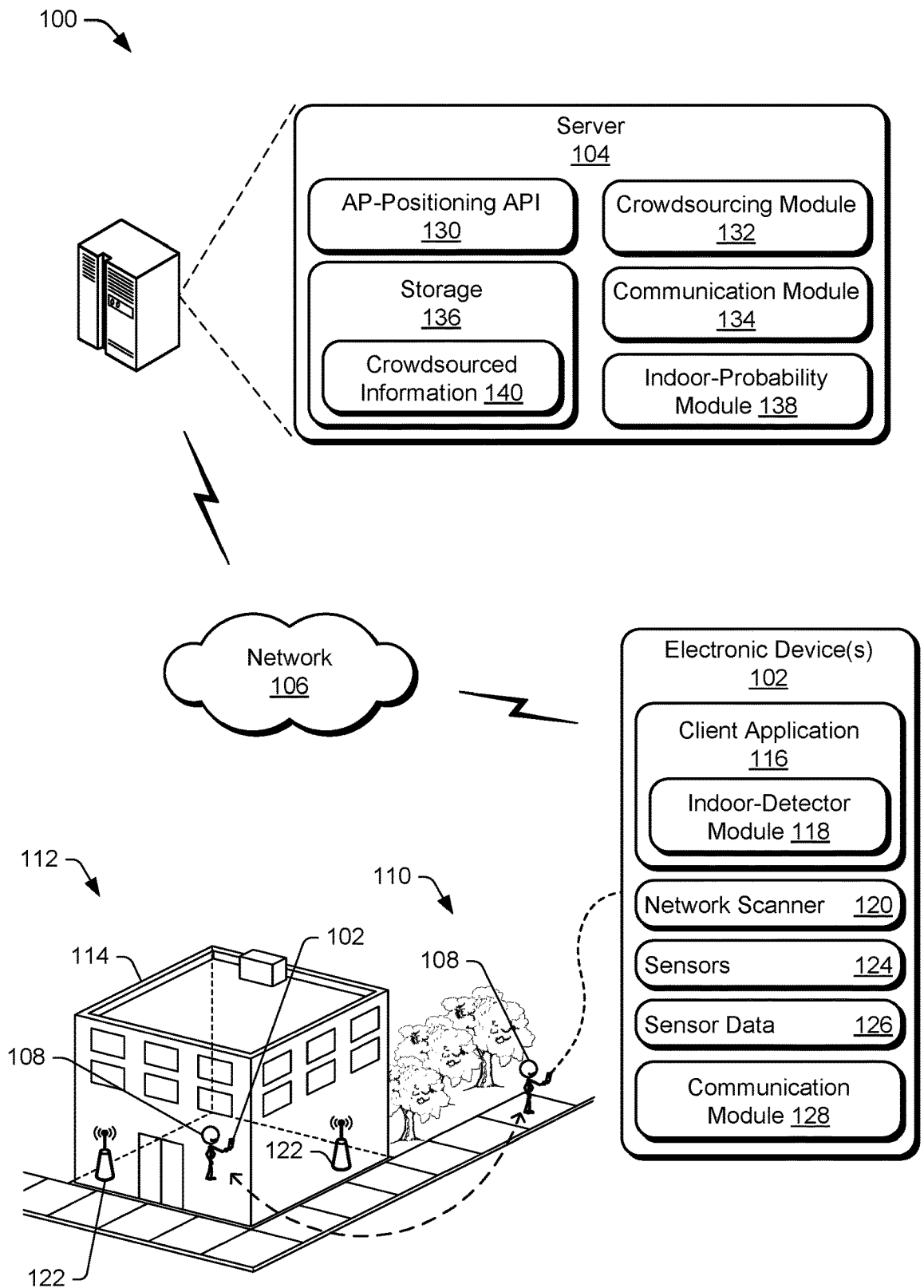
FIG. 1 illustrates an example environment of a client-server approach for indoor-outdoor detection of an electronic device, and associated systems and methods.

Aspects of a client-server approach for indoor-outdoor detection of an electronic device, and associated systems and methods are described. The client runs on an electronic device and the server runs at the backend. The server may compute several indications or signals that can be used to indicate whether the electronic device is deep indoors or not. In aspects, the server may use a crowdsourced approach in which signals are collected from sensors (e.g., GPS, Wi-Fi, inertial sensors) of a plurality of electronic devices. Using the collected signals, information can be obtained that provides an indication that a particular access point has a location falling within a certain category (such as outdoors or indoors). In some instances, the indoors category can be further distinguished between deep indoors or lightly indoors. Such a determination can be used by the electronic device to distinguish whether its own location is within one of those categories (such as outdoors or indoors). If indoors, the electronic device can further distinguish whether its location is deep indoors or lightly indoors. Responsive to the determination, the electronic device can trigger one or more corresponding functions to improve its performance and/or reduce power consumption.

Broadly, the terms "lightly indoors" or "light-indoor location" may refer to a location near a perimeter of a building that interferes with the GPS signal such that a signal strength of the GPS signal is low, and the terms "deep indoors" or "deep-indoor location" may refer to an area that is farther inside the building, distal from the perimeter of the building or structure. Deep indoors may include areas within the building or structure that are far from windows, balconies, and glass-curtain walls, whereas lightly indoors may include areas near the windows, balconies, and glass-curtain walls. In some instances, the building may interfere with the GPS signal or GNSS signal such that no GPS signal or GNSS signal is detectable (e.g., no GPS or GNSS satellite in view). Lightly indoors may be characterized by a weak GPS signal (e.g., not enough satellites for positioning) of the electronic device 102 at the time of observing a wireless-network access point, whereas deep indoors may be characterized by an absent GPS signal (no GPS signal is detected) at the time of observing a wireless-network access point. Further discussion of this and other aspects is provided in more detail below.

In one implementation, these signals can be transmitted in raw form to the electronic device and the electronic device can process the raw signals. In this way, each client (e.g., application-specific client, system-specific client) can build their own approach to how it uses the raw data to determine if the electronic device within the categories such as outdoors, lightly indoors, or deep indoors.

In another implementation, the server may provide, per access point observed by the electronic device, a probability that the access point is, for example, deep indoors or not. Then, the server may transmit the probability, per access point observed by the electronic device, to the client of the electronic device. The client may then compile these probabilities (e.g., combine the probabilities of the access points in range of the electronic device) to estimate or compute a probability indicating a likelihood that the location of the electronic device (and the user of the electronic device) falls within a given category (i.e., deep indoors, lightly indoors, or outdoors). In further alternative implementations, the server, rather than the client device, may determine the probability indicating a likelihood that the location of the electronic device falls within a given category from the signals received from the client device.

In aspects, the electronic device can use the determination ("indoor-outdoor determination") of its location being within categories such as deep indoors, lightly indoors, or outdoors to reduce power consumption by automatically turning off one or more sensors. For example, GPS scans can be turned off if the electronic device is indoors (where GPS signals are generally weak due to interference by the building or structure). GPS scans are known to be expensive sensors in terms of power consumption and, therefore, disabling GPS scans can reduce the power consumption.

In some aspects, the electronic device can also use the indoor-outdoor determination for resource allocation. For example, the electronic device can use the indoor-outdoor determination to improve location accuracy when indoors by using different location sensors (e.g., use Wi-Fi signals instead of GPS signals) or assigning weights to different relative location signals (e.g., assign a lower weight to GPS signals and a higher weight to Wi-Fi signals).

In yet other aspects, the indoor-outdoor determination can be used by some applications running on the electronic device to switch modes. For example, an augmented-reality application may use a 3D mode outdoors to show 3D images of objects in a field of view of a camera on the electronic device. When the user carries the electronic device into a building or structure, the augmented-reality application may automatically switch from the 3D mode, which corresponds to the electronic device being outdoors, to a two-dimensional (2D) mode, which corresponds to the electronic device being indoors, to avoid showing the 3D images associated with the outdoors. The opposite may occur when the user exits the building or structure to enable the augmented-reality application to seamlessly switch from the 2D mode to the 3D mode. In this way, the augmented-reality application can switch from a first mode to a second mode based on the current location of the electronic device differing from a previously-determined location of the electronic device. Accordingly, applications can provide different user experiences based on whether the electronic device is outdoors or indoors.

These are but a few examples of how the described techniques and devices may be used to enable a client-server approach for indoor-outdoor detection of an electronic device, and associated systems and methods. Other examples and implementations are described throughout this document. The document now turns to an example system, after which example methods are described.

Example System

FIG. 1 illustrates an example environment 100 of a client-server approach for indoor-outdoor detection of an electronic device, and associated systems and methods. The client-server approach includes an electronic device 102 (e.g., mobile electronic device) and a server 104 that communicate with each other via a network 106, such as a cellular network or other wireless network. The electronic device 102 may be carried by a user 108 to a variety of environments, such as outdoors 110 or indoors 112 (e.g., inside a building 114 or structure, tunnel, cavern, subway).

The electronic device 102 may include a client application 116 that implements an indoor-detector module 118 to determine, based on information received from the server 104, a likelihood (e.g., probability) that the electronic device 102 is outdoors 110 or indoors 112. As further described below, a determination of the indoors 112 may be enhanced by differentiating whether the electronic device 102 is lightly indoors or deep indoors (i.e., by differentiating subcategories within the category "indoors").

The electronic device 102 may include a network scanner 120, which is usable to scan for nearby wireless networks provided by one or more access points 122. In addition, the electronic device 102 may include a variety of sensors 124 that detect sensor data 126 usable to assist in determining the device's location. Any suitable sensor(s) 124 can be used, examples of which include a GPS sensor, a Global Navigation Satellite System (GNSS) sensor, a barometric pressure sensor, an inertial sensor, a temperature sensor, a humidity sensor, a light sensor, or any combination thereof. The sensor data 126 may include any suitable sensor data usable to assist in determining the device's location, examples of which include GPS data, GNSS data, barometric pressure, inertial data, ambient temperature of the device's surrounding environment, humidity, light intensity, or any combination thereof.

The electronic device 102 may also include a communication module 128 for communicating with the server 104. In aspects, the client application 116 may utilize the communication module 128 to transmit the sensor data 126, along with an indication of observed access points 122, to the server 104.

The server 104 runs at the backend and includes an access point (AP)-positioning application programming interface (API) 130 (AP-positioning API 130), a crowdsourcing module 132, a communication module 134, and storage 136. In some aspects, the server 104 may also include an indoor-probability module 138. The crowdsourcing module 132 is configured to collect, over a duration of time, information (e.g., sensor data 126, access-point identification, wireless-network identification) from a plurality of electronic devices that observed the access points 122 via wireless-network scans (e.g., Wi-Fi scans). The server 104 stores the collected information (e.g., crowdsourced information 140) in the storage 136, which may include cloud storage or other backend storage. The crowdsourced information 140 may be stored in the form of models, e.g., a different model for each access point for which the server 104 has received crowdsourced signals from electronic devices.

The AP-positioning API 130 is callable by the electronic device 102 to access the crowdsourced information 140 for signals or data corresponding to each access point 122 observed by the electronic device 102. The AP-positioning API 130 may return information, per access point 122 observed by the electronic device 102, usable to determine a likelihood that the access point 122 is outdoors, lightly indoors, or deep indoors. In some aspects the returned information includes a portion of the crowdsourced information 140 in the form of raw data or signals. The indoor-detector module 118 of the electronic device 102 can fuse the raw data or signals to compute a probability that the recent wireless-network scan performed by the electronic device 102 was collected from an outdoor location, a light-indoor location, or a deep-indoor location. Alternatively, the indoor-probability module 138 at the server 104 can compute such probability for the electronic device 102 and the communication module 134 can transmit the probability to the electronic device 102.

Figure 2:
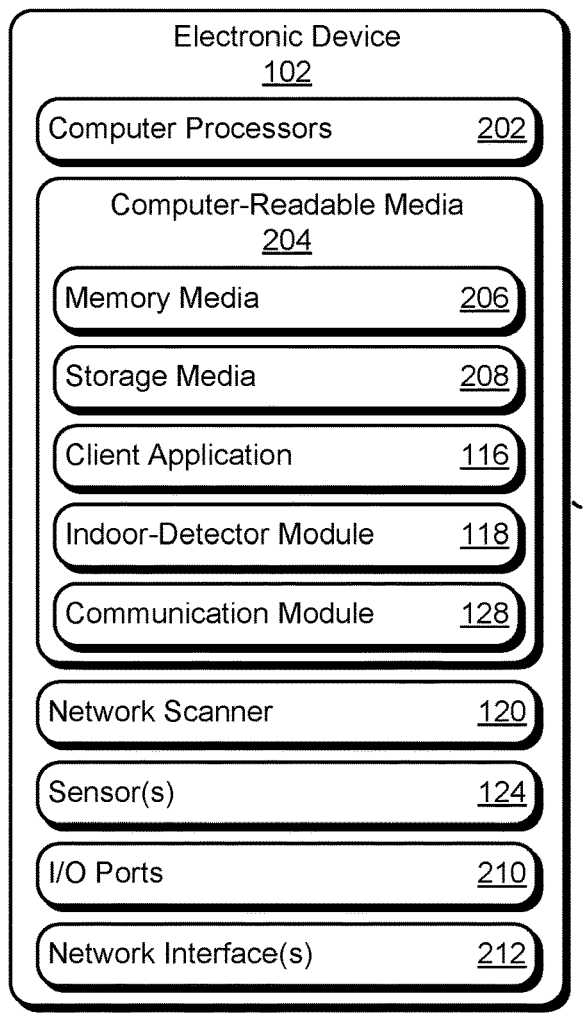
FIG. 2 illustrates an example implementation of the electronic device from FIG. 1.
Figure 2:
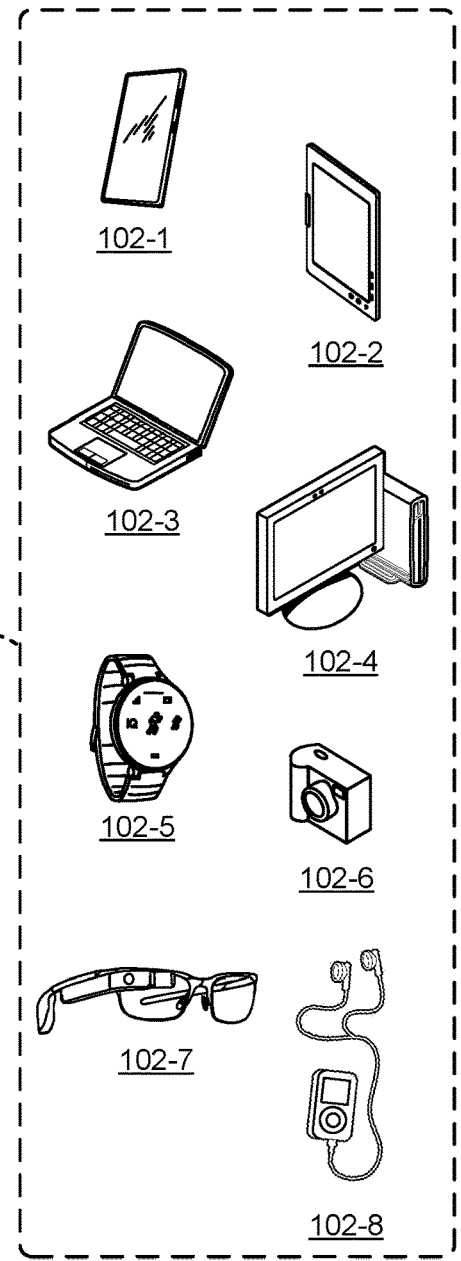

FIG. 2 illustrates an example implementation 200 of the electronic device 102 from FIG. 1 in greater detail in accordance with one or more aspects. The electronic device 102 is illustrated with various non-limiting example devices: a smartphone 102-1, a tablet 102-2, a laptop 102-3, a desktop 102-4, a wearable computing device 102-5 (e.g., smartwatch), a digital camera 102-6, computing spectacles 102-7 (e.g., smart glasses), and a portable media player 102-8. The electronic device 102 includes computer processor(s) 202 and computer-readable media 204, which includes memory media 206 and storage media 208. Applications and/or an operating system (not shown) embodied as computer-readable instructions on computer-readable media 204 can be executed by the processor(s) 202 to provide some of the functionalities described herein. The computer-readable media 204 also includes the client application 116, which can utilize the communication module 128 to communicate with the server 104 in FIG. 1. The client application 116 can also utilize the indoor-detector module 118 to detect a probability that the electronic device 102 is at an outdoor location, a light-indoor location, or a deep-indoor location.

The electronic device 102 may also include the sensor(s) 124, the network scanner 120, I/O ports 210, and network interfaces 212. I/O ports 210 can include a variety of ports, such as by way of example and not limitation, high-definition multimedia interface (HDMI), digital video interface (DVI), display port, fiber-optic or light-based, audio ports (e.g., analog, optical, or digital), universal serial bus (USB) ports, serial advanced technology attachment (SATA) ports, peripheral component interconnect (PCI) express based ports or card slots, serial ports, parallel ports, or other legacy ports. The electronic device 102 may also include the network interface(s) 212 for communicating data over wired, wireless, or optical networks. By way of example and not limitation, the network interface 212 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 3:
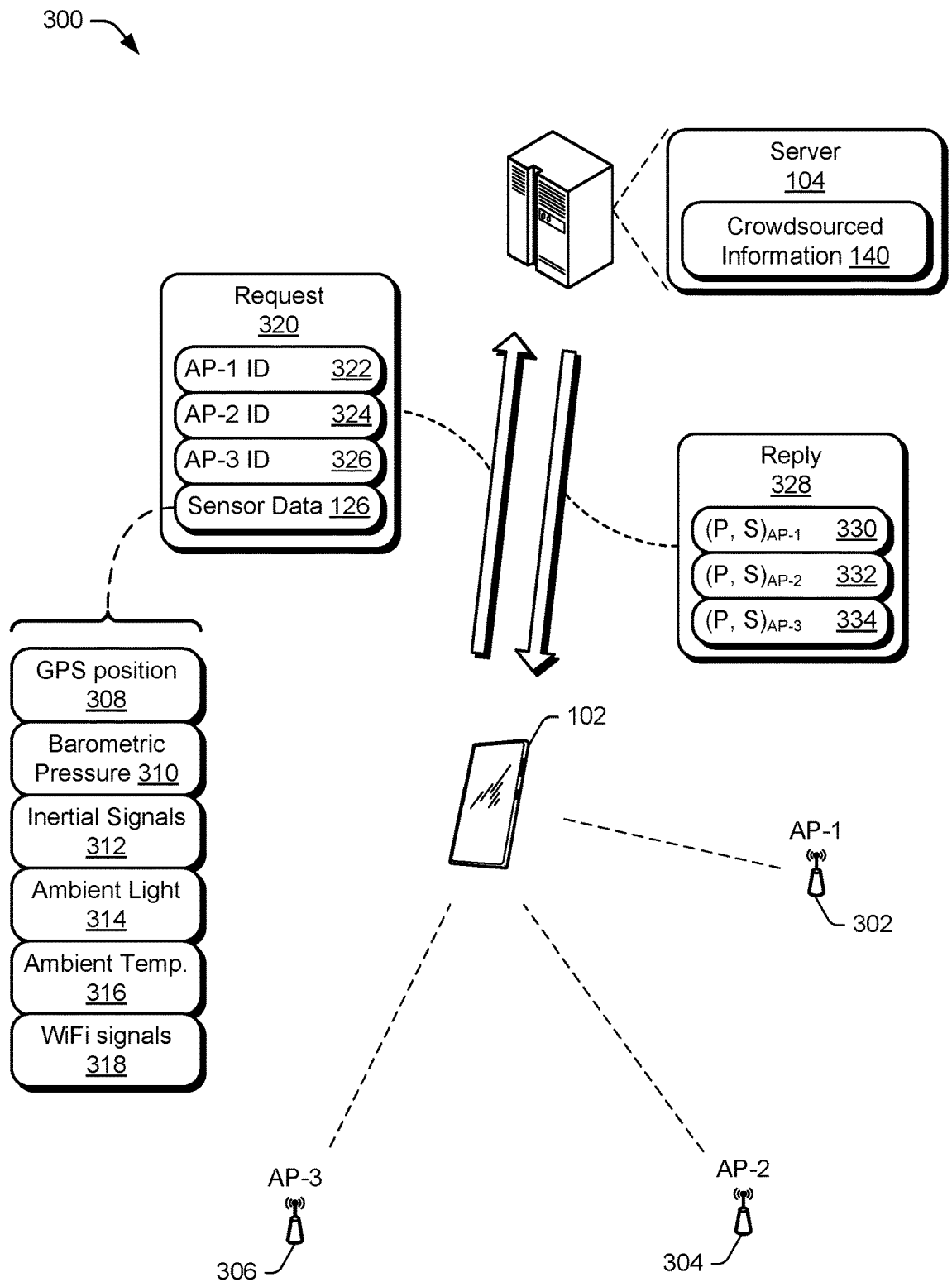
FIG. 3 illustrates an example implementation of the client-server approach for indoor-outdoor detection of the electronic device from FIG. 1.

FIG. 3 illustrates an example implementation 300 of the client-server approach for indoor-outdoor detection of the electronic device 102 from FIG. 1. In the illustrated example, the electronic device 102 performs a Wi-Fi scan and detects a first access point (AP-1 302), a second access point (AP-2 304), and a third access point (AP-3 306) within range of the electronic device 102. In addition, the electronic device 102 collects sensor data 126, including any suitable location-related signal. Some examples of sensor data 126 include a current GPS position 308 of the electronic device 102, barometric pressure 310 of the air around the electronic device 102, inertial signals 312 corresponding to the electronic device 102, ambient light 314, ambient temperature 316, and Wi-Fi signals 318.

The sensor data 126, including different combinations thereof, can provide an indication that the electronic device 102 is indoors. For example, if the electronic device 102 uses a barometer and the barometric pressure 310 indicates that the electronic device 102 has changed elevation (e.g., changed floors), then it may be more probable that the electronic device 102 is indoors. If the electronic device 102 detects a Wi-Fi signal 318 with a particular access point during the change in elevation, then such a combination of signals may indicate that the particular access point is indoors rather than outdoors. In another example, if the electronic device 102 measures its GPS position 308 with a high signal strength, then it is probable that an observed access point is outdoors or near the outdoors because GPS signals generally have weaker signal strength indoors.

The electronic device 102 transmits a request 320 to the server 104 for information usable to estimate in which of an outdoor location, a light-indoor location, or a deep-indoor location the electronic device 102 is currently located. The electronic device 102 includes in the request 320 an identity of each observed access point (e.g., AP-1 ID 322, AP-2 ID 324, and AP-3 ID 326).

The server 104 accesses the crowdsourced information 140 and uses the identities of the observed access points in the request to locate data or signals collected from other electronic devices that previously detected the observed access points (e.g., the AP-1 302, the AP-2 304, and the AP-3 306). The crowdsourced information 140 may include raw or processed sensor information, similar to the sensor data 126 (e.g., the GPS position 308, the ambient barometric pressure 310, the inertial signals 312, the ambient light 314, the ambient temperature 316, and the Wi-Fi signals 318), of respective electronic devices that detected the observed access points at times and locations of the detections. Other raw or processed sensor information that can be used to indicate if the electronic device 102 is indoors or outdoors can also be used, including activity recognition, movement speed and direction, a type of active application running on the device (e.g., exercise application, augmented-reality application, navigation application).

The server 104 can add the sensor data 126 to the crowdsourced information 140 for each of the access points (AP-1 302, AP-2 304, and AP-3 306) identified in the request 320. Using the crowdsourced information 140, the server can determine, for each access point, a percentage P of detections of the access point that were accompanied by a GPS signal of the detecting device. In aspects, the percentage P indicates how many times other devices detected a GPS signal when observing the access point relative to a total number of detections of the access point in the crowdsourced information 140. The percentage P may represent a portion or fraction of group or whole, including a value defined by x/100. The server 104 can also use the crowdsourced information 140 to determine an RSS value S below which the detections are not accompanied by a GPS signal of the detecting device (e.g., the minimum RSS value, relative to a total number of detections of the access point in the crowdsourced information 140 with corresponding RSS values, which is accompanied by a GPS signal of an electronic device that detected the access point).

The server 104 can transmit a reply 328 that includes the percentage P and the RSS value S for each access point in the request 320. For example, the reply 328 includes (P, S)$_{AP-1}$ 330, (P, S)$_{AP-2}$ 332, and (P, S)$_{AP-3}$ 334. The server 104 can also transmit other information, per access point, such as a GPS location of the access point and/or a probability, calculated from the crowdsourced information 140, that the respective access point is located indoors (or a probability that the respective access point is located outside).

The electronic device 102 can then use the information in the reply 328 to estimate a probability, for each access point (AP-1 302, AP-2 304, and AP-3 306), that the access point is located deep indoors (or outdoors or lightly indoors). By fusing the probabilities of the observed access points (AP-1 302, AP-2 304, and AP-3 306), the electronic device 102 can estimate the likelihood that its own location is deep indoors (or outdoors or lightly indoors). Further details of this and other features are described below with respect to example methods.

Example Methods

Figure 4:
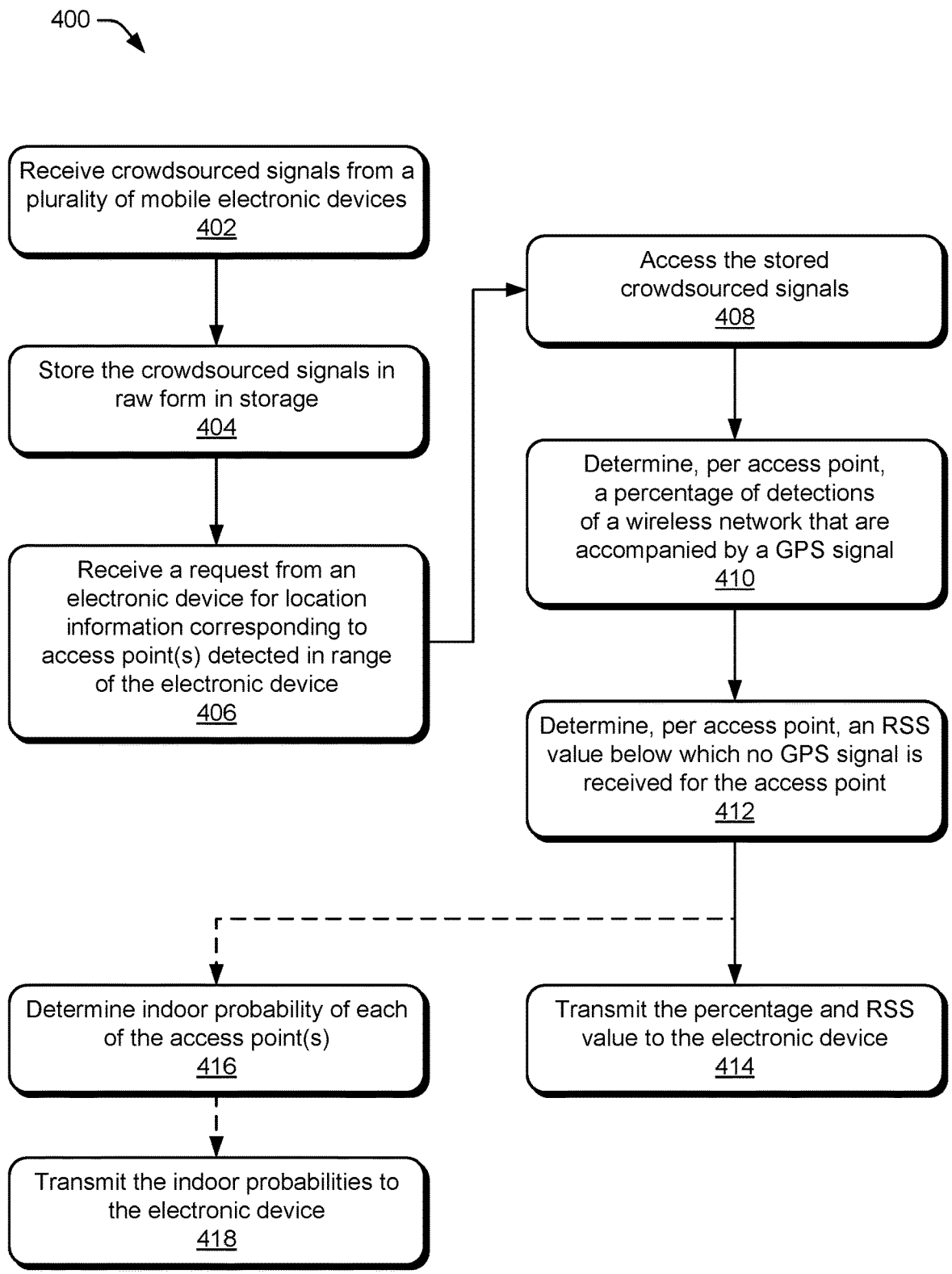
FIG. 4 depicts a method, performed by a server, for enabling indoor-outdoor detection of an electronic device.
Figure 5:
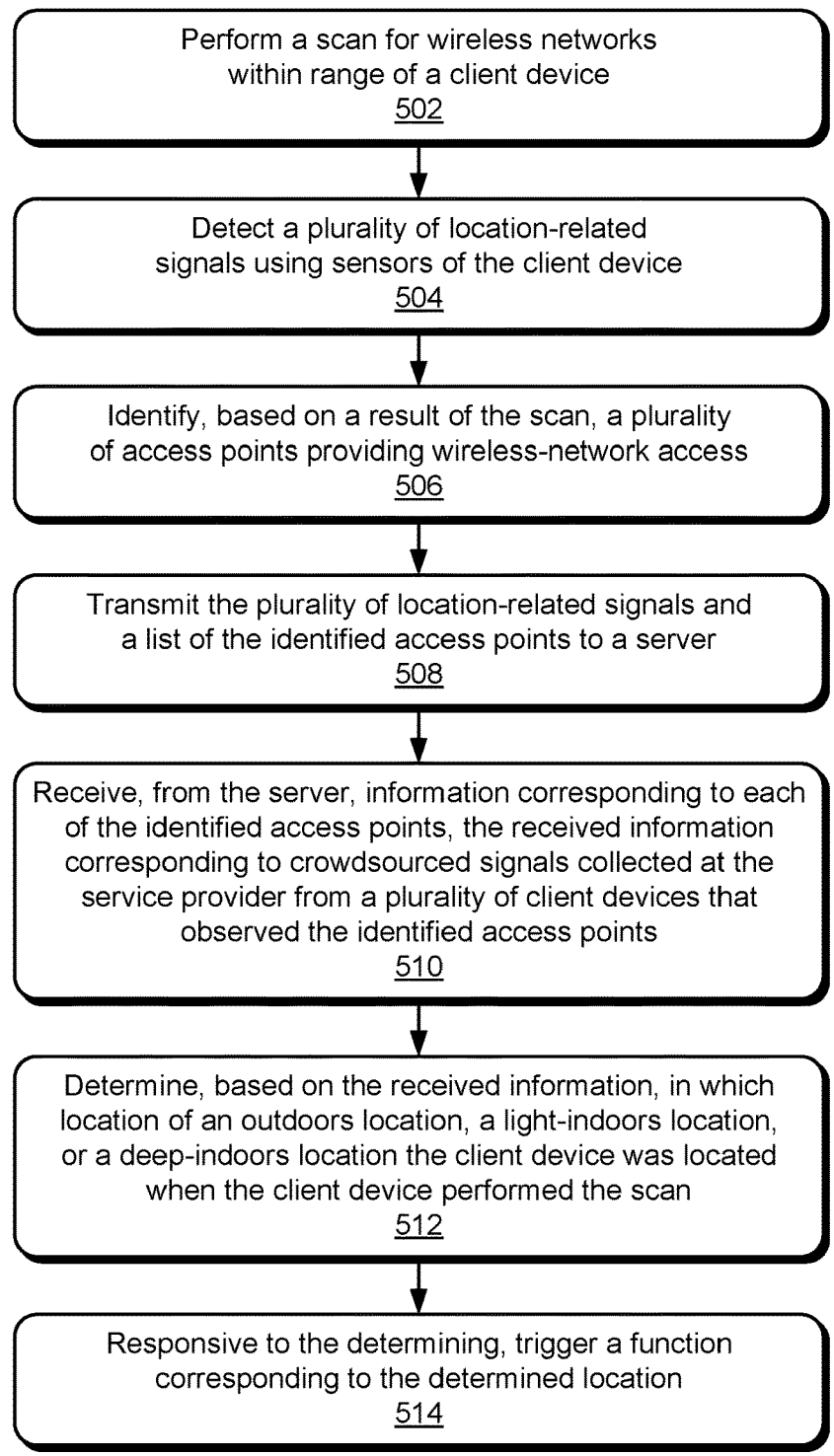
FIG. 5 depicts a method, performed by an electronic device, for enabling indoor-outdoor detection of the electronic device.

FIGS. 4 and 5 depicts methods 400 and 500, which are shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example environment 100 of FIG. 1 or to entities or processes as detailed in FIGS. 2 and 3, reference to which is made for example only. The techniques are not limited to performance by one entity or multiple entities operating on one device.

FIG. 4 depicts a method, performed by a server, for enabling indoor-outdoor detection of an electronic device. The server may be the server 104 from FIG. 1 and the electronic device may be the electronic device 102 from FIG. 1. The server 104 may communicate with the electronic device 102 via the network 106.

At 402, the server receives crowdsourced signals from a plurality of mobile electronic devices that observe the access point. For example, the server receives and processes crowdsourced signals, including GPS signals, Wi-Fi signals, barometric pressure signals, inertial sensor signals, and other location-related signals detected by the plurality of mobile electronic devices when detecting the access point.

At 404, the server stores the crowdsourced signals in raw form in storage. In aspects, the server can aggregate the crowdsourced signals per access point. Storing the raw form of the crowdsourced signals may enable the server to provide raw signals to a requesting client application, which may enable the client application to use its own application-specific or system-specific models, algorithms, parameters, settings, and requirements on the raw signals to determine the likelihood that the electronic device on which the client application is running is outdoors or indoors.

At 406, the server receives a request from an electronic device for location information corresponding to an access point(s) detected in range of the electronic device. For example, the server receives information associated with a wireless-network scan (e.g., Wi-Fi scan) performed by the electronic device 102, such as the request 320 in FIG. 3. The scan includes an identity of one or more access points detected by the electronic device 102. The request may also include other location-related signals detected by the electronic device 102, such as a GPS signal corresponding to a GPS location (e.g., longitude position, latitude position) of the electronic device 102 at the time and location when the electronic device 102 performed the scan. The other location-related signals may also include signals indicating an amount or level of ambient light around the electronic device 102, barometric pressure of the ambient environment around the electronic device 102, an RSS value corresponding to the access point relative to the electronic device 102, ambient temperature, etc.

At 408, the server accesses the stored crowdsourced signals, in response to the request, to locate a subset of the stored crowdsourced signals that correspond to the access points identified by the electronic device. In addition, the server can combine the signals received from the electronic device 102 with the stored crowdsourced signals corresponding to the access points identified in the scan.

At 410, the server determines, per access point identified by the electronic device, a percentage of detections that are accompanied by a GPS signal. The detections are determined from the stored crowdsourced signals and include detections of the access point by a subset of the plurality of mobile electronic devices. This creates a distinction between (i) detections (e.g., Wi-Fi observations) of the access point without a corresponding GPS signal of a respective electronic device observing the access point and (ii) detections of the access point accompanied by a GPS signal of the respective electronic device. For example, if a high percentage (e.g., approximately 75% or greater) of the detections of an access point are accompanied by a GPS signal, then there is a high likelihood that the access point is outdoors. If a low percentage (e.g., approximately 25% or less) of the detections of the access point are accompanied by a GPS signal or, conversely, a high percentage (e.g., approximately 75% or greater) of the detections of the access point are not accompanied by a GPS signal, then there is a high likelihood that the access point is deep indoors. If the percentage is a moderate percentage (e.g., between approximately 25% and 75%), indicating that some electronic devices that detect the access point also detect a GPS signal and some electronic devices that detect the access point do not also detect a GPS signal, then it is likely that the access point is lightly indoors (e.g., located near (inside or outside) the outer perimeter of the building).

At 412, the server determines, per access point identified by the electronic device, an RSS value below which no GPS signal is received for the access point. For example, using the stored crowdsourced signals, the server can determine and/or record the RSS value. Access points with no GPS fixes observed can be assigned a unique RSS value to indicate that the access point is deep indoors. The same may apply to access points with GPS fixes observed at low RSS values. In an example, a low RSS value may be within a range of −105 decibel-milliwatt (dBm) to approximately −80 dBm, an intermediate RSS value may be within a range of approximately −80 dBm to approximately −65 dBm, a strong RSS value may be within a range of approximately −65 dBm to approximately −50 dBm, and a very strong RSS value may be a value greater than approximately −50 dBm.

In addition to the RSS value, a signal-to-noise density (CNO) value may be used to indicate deep indoors, lightly indoors, or outdoors. For example, CNO signals less than approximately 15 decibel-Hertz (dBHz) may indicate deep indoors, CNO signals within a range of approximately 15 dBHz to approximately 23 dBHz may indicate lightly indoors, and CNO signals greater than approximately 23 dBHz may indicate outdoors. The value ranges for the RSS values and the CNO values are described as examples only and the techniques described herein are not intended to be limited by such examples.

Table 1 below describes example combinations of signal strength and GPS signals that may indicate that an access point is located deep indoors, lightly indoors, or outdoors.

TABLE 1

Example Combinations of Signal Strength and GPS Signal for Indoor-Outdoor Detection of an Access Point

| | Signal Strength | | GPS Signal | |
|---|---|---|---|---|
| | High | Low | Yes | No |
| Deep Indoors | X | | | X |
| | | X | | X |
| Lightly Indoors | X | | X | |
| | | X | | X |
| Lightly Indoors | X | | | X |
| Outdoors | | X | X | |
| | X | | X | |
| | | X | X | |

In one example, an access point may be determined to be deep indoors based on a combination of (i) access-point detections having a high-signal strength with no accompanying GPS signal and (ii) access-point detections having a low-signal strength with no accompanying GPS signal. In another example shown in Table 1, if an access point is located lightly indoors, electronic devices may detect GPS at high signal strength because sometimes GPS can be detected near the perimeter of a building. But if the electronic device 102 is moved away from the access point (e.g., further indoors), the electronic device 102 may not detect GPS. In such a case, and as illustrated in Table 1, the access point may be determined to be lightly indoors based on a combination of (i) access-point detections having a high-signal strength and accompanying GPS signal and (ii) access-point detections having a low-signal strength and no accompanying GPS signal.

In a further example shown in Table 1, as access point may be determined to be lightly indoors based on a combination of (iii) access-point detections having a high-signal strength with no accompanying GPS signal and (iv) access-point detections having a low-signal strength and accompanying GPS signal (e.g., devices that moved away from the access point to a location outdoors). In some cases, the determination of lightly indoors for the access point may combine (iii) and (iv) with (v) access-point detections having a low-signal strength and no accompanying GPS signal (e.g., devices that moved away from the access point to a location further indoors). In yet another example shown in Table 1, an access point may be determined to be outdoors based on a combination of (vi) access-point detections having a high-signal strength and accompanying GPS signal and (vii) access-point detections having a low-signal strength and accompanying GPS signal.

At 414, the server transmits the percentage and the RSS value, per access point, to the electronic device. The percentage and the RSS value for each access point observed by the electronic device 102 can enable the client application on the electronic device 102 to determine a probability ("indoor probability"), for each access point, that the access point is deep indoors, lightly indoors, or outdoors. These probabilities may enable the client application to estimate the probability that the electronic device 102 is deep indoors, lightly indoors, or outdoors.

Alternatively, at 416, the server estimates the indoor probability of each of the access points identified in the scan. Any suitable aggregation function can be implemented to estimate the probability that the access point is deep indoors.

At 418, the server transmits the indoor probabilities to the electronic device. Transmitting the indoor probability of each access point observed by the electronic device 102 may enable the electronic device 102 to fuse the probabilities of the observed access points to determine if the electronic device 102 is located deep indoors, lightly indoors, or outdoors. Alternatively, rather than transmitting the indoor probabilities to the electronic device 102, the server 104 may itself fuse the probabilities of the observed access points to determine if the electronic device 102 is located deep indoors, light indoors, or outdoors; the server 104 may subsequently transmit the outcome of this process to the electronic device 102.

FIG. 5 depicts a method, performed by an electronic device, for indoor-outdoor detection of the electronic device. The electronic device may be the electronic device 102, which communicates with the server 104 via the network 106.

At 502, an electronic device performs a scan for wireless networks within range of the electronic device. The scan may include any suitable Wi-Fi scan for wireless networks provided by access points, e.g., using 2.4 GHz and/or 5 GHz bands, 802.11 standards, etc.

At 504, the electronic device detects a plurality of location-related signals using sensors of the electronic device. For example, the electronic device 102 may detect GPS position 308, ambient barometric pressure 310, inertial signals 312, ambient light 314, ambient temperature 316, and Wi-Fi signals 318.

At 506, the electronic device identifies, based on a result of the scan, a plurality of access points providing wireless-network access. For example, the electronic device 102 may detect at least the AP-1 302, the AP-2 304, and the AP-3 306 from FIG. 3. At this point, the location of the detected access points being deep indoors, lightly indoors, or outdoors may be unknown to the electronic device 102.

At 508, the electronic device transmits the plurality of location-related signals and a list of the identified access points to a server. For example, the electronic device 102 transmits a request (e.g., the request 320 in FIG. 3), which may include a call to an API (e.g., the AP-Positioning API 130 in FIG. 1) at the server 104.

At 510, the electronic device receives, from the server, information corresponding to each of the identified access points, the received information corresponding to crowd-sourced signals collected at the server from a plurality of electronic devices that observed the identified access points. The received information may include, for each access point identified in the request, (i) the percentage P of detections of the access point, from the crowdsourced information, that are accompanied by a GPS signal and (ii) the RSS value S below which the detections of the access point are not accompanied by a GPS signal. In some aspects, the received information may also include a GPS position of each of the identified access points in 3D (x, y, z). In one example, the received information may be in the form of models, e.g., a different model for each access point identified in the request (or a model for each access point that the server 104 has stored).

At 512, the electronic device determines, based on the received information, in which location of an outdoor location, a light-indoor location, or a deep-indoor location the electronic device was most-likely located when the electronic device performed the scan. For example, the electronic device 102 may apply an algorithm, based on the reply 328 from the server 104, to fuse the information available for each of the access points observed in the Wi-Fi scan and compute the probability that the current Wi-Fi scan was collected from an indoor location (or an outdoor location). An example algorithm may rely on an assumption that the more access points in the Wi-Fi scan that (i) are not associated with GPS signal presence and/or (ii) are associated with a high RSS below which no GPS signal is received, the higher the probability that the electronic device 102 is indoors.

To differentiate between outdoors, lightly indoors, and deep indoors, the electronic device 102 (or the client application 116 running on the electronic device 102 shown in FIG. 1) can enhance the algorithm described above by setting thresholds on the received information, per access point. For example, a threshold value can be set for the number of access points observed with no associated GPS and/or number of access points with a high RSS value below which no GPS is received. If the electronic device 102 observes, e.g., six access points in the Wi-Fi scan, the electronic device 102 may use a threshold value (e.g., five) to determine that e.g., if five or more of those access points have no associated GPS, the probability that the location of the Wi-Fi scan is a deep-indoor location is high. Similarly, if a threshold number of access points (e.g., seven out of ten) have a high RSS value below which no GPS is received for the detecting device, then it is more likely that the location of the Wi-Fi scan is deep indoors.

Alternatively or additionally, the electronic device 102 can differentiate between outdoors, lightly indoors, and deep indoors by setting a threshold(s) on the computed probability. In an example implementation, the electronic device 102 can use the received information to calculate a probability indicating a likelihood that the electronic device 102 is deep indoors. If the probability is less than a first threshold $T_1$, then the electronic device 102 is not likely to be indoors but is more likely to be outdoors. If the probability is between the first threshold $T_1$ and a higher, second threshold $T_2$, then it is likely that the electronic device 102 is at a light-indoor location, such as near a perimeter of the building. If the probability is greater than the higher, second threshold $T_2$, then the electronic device 102 is likely deep indoors.

Conversely, the electronic device 102 can use the received information to calculate a probability indicating that the electronic device 102 is more likely to be outdoors. For example, if the probability is less than the first threshold $T_1$, then the electronic device 102 is not likely to be outdoors but is more likely to be deep indoors. If the probability is between the first threshold $T_1$ and a higher, second threshold $T_2$, then it is likely that the electronic device 102 is at a light-indoor location, such as near a perimeter of the building. If the probability is greater than the higher, second threshold $T_2$, then the electronic device 102 may likely be outdoors.

The first and second thresholds may be application-specific, such that different applications may use different thresholds to determine the likelihood of the electronic device 102 being outdoors, light-indoors, or deep indoors. Application-specific thresholds may enable a particular application to trigger a location-based function or action that may improve performance, reduce power consumption, or allocate resources. Alternatively, the first and second thresholds may be system-specific, such that the thresholds are specific to the operating system of the electronic device 102 and are defined by a manufacturer of the operating system. System-specific thresholds may enable the electronic device 102 to trigger a location-based function to an action that may, at a system level, improve performance, reduce power consumption, or allocate resources, regardless of which an application is running In some aspects, the thresholds may be defined by a user of the electronic device 102.

In some aspects, the server 104 can assign an extra float in the model of an access point to indicate that the access point is deep indoors. In one example, bounding boxes can be applied to the Wi-Fi scan of the electronic device 102 for additional filtering to enhance the accuracy of the determination of which of the outdoor location, the light-indoor location, or the deep-indoor location is most-likely the location of the electronic device 102. In alternative approaches, the server 104 may carry out step 512 following the approach described above for the electronic device 102, and may subsequently transmit the outcome to the electronic device 102.

At 514, responsive to the determination, the electronic device triggers a function corresponding to the determined location. The function may be application-specific (e.g., switch modes, adjust volume, adjust brightness) or system-specific (e.g., turn on/off GPS detection, turn on/off Wi-Fi scan, turn on-off Bluetooth™, adjust screen brightness or other system setting).

Some examples are described below:

Example 1: A method performed by a server, for indoor-outdoor detection of an electronic device, the method comprising:
receiving a request from an electronic device for location information corresponding to access points detected in range of the electronic device and identified in the request, the request including sensor data detected by the electronic device at a location of the electronic device;
accessing, in response to receiving the request, stored crowdsourced signals, including access-point detections and corresponding sensor data previously received from a plurality of electronic devices that observed a plurality of access points, the accessing to locate a subset of the stored crowdsourced signals that correspond to the access points identified in the request;
determining, based on the stored crowdsourced signals and per access point identified in the request, a percentage of detections of the access point that are accompanied by a global positioning system, GPS, signal of a device that detected the access point;
determining, based on the stored crowdsourced signals and per access point identified in the request, a received signal strength, RSS, value below which no GPS signal accompanies the detections of the access point; and
transmitting the percentage and the RSS value, per access point identified in the request, to the electronic device to enable the electronic device to determine if the location of the electronic device is an outdoor location or an indoor location and trigger a corresponding function.

Example 2: The method as recited in example 1, wherein the transmitting includes transmitting the subset of the crowdsourced signals in raw form to the electronic device to enable the electronic device to use application-specific parameters or system-specific parameters for distinguishing whether the location of the electronic device is the outdoor location or the indoor location.

Example 3: The method as recited in example 1 or example 2, wherein the sensor data includes at least one of a GPS position corresponding to the location of the electronic device, barometric pressure, inertial signals corresponding to the electronic device, ambient light, ambient temperature, or Wi-Fi signals.

Example 4: The method as recited in any one of the preceding examples, further comprising aggregating the sensor data with the stored crowdsourced signals.

Example 5: The method as recited in any one of the preceding examples, wherein the percentage indicates how many times other devices detected a GPS signal when observing the access point relative to a total number of detections of the access point in the stored crowdsourced signals, and wherein:
a high percentage indicates that the access point is likely outdoors;
a low percentage indicates that the access point is likely deep indoors; and
a moderate percentage indicates that the access point is likely lightly indoors.

Example 6: The method as recited in any one of the preceding examples, wherein the RSS value represents a minimum RSS value that is accompanied by a GPS signal of a device that detected the access point, the minimum RSS value relative to a total number of detections of the access point in the stored crowdsourced signals with corresponding RSS values.

Example 7: The method as recited in any one of the preceding examples, further comprising:
calculating, for a respective access point identified in the request, a probability indicating a likelihood that the respective access point is deep indoors; and
transmitting the probability of the respective access point to the electronic device.

Example 8: The method as recited in example 7, wherein the indoor location includes a light-indoor location and a deep-indoor location, the method further comprising:
determining, based on a combination of computed probabilities for the identified access points, an additional probability indicating a likelihood that the location of the electronic device is the deep-indoor location; and
determining that the location of the electronic device is:
the outdoor location if the additional probability is less than a first threshold value;
the light-indoor location if the additional probability is between the first threshold value and a second threshold value that is greater than the first threshold value; or
the deep-indoor location if the additional probability is greater than the second threshold value.

Example 9: The method as recited in any one of examples 1 to 6, further comprising:
calculating, for a respective access point identified in the request, a probability indicating a likelihood that the respective access point is outdoors; and
transmitting the probability of the respective access point to the electronic device.

Example 10: The method as recited in example 9, wherein the indoor location includes a light-indoor location and a deep-indoor location, the method further comprising:
determining, based on a combination of computed probabilities for the identified access points, an additional probability indicating a likelihood that the location of the electronic device is the outdoor location; and
determining that the location of the electronic device is:
the deep-indoor location if the additional probability is less than a first threshold value;
the light-indoor location if the additional probability is between the first threshold value and a second threshold value that is greater than the first threshold value; or
the outdoor location if the additional probability is greater than the second threshold value.

Example 11: The method as recited in any one of examples 7 to 10, wherein transmitting the probability of the respective access point to the electronic device enables the electronic device to trigger a function responsive to a determination of which of the deep-indoor location, the light-indoor location, or the outdoor location corresponds to the location of the electronic device.

Example 12: The method as recited in any one of the preceding examples, wherein the outdoor location is outside of a building or structure.

Example 13: The method as recited in any one of the preceding examples, wherein the light-indoor location is proximate to a perimeter of a building or structure that interferes with the GPS signal such that a signal strength of the GPS signal is low.

Example 14: The method as recited in any one of the preceding examples, wherein the deep-indoor location includes an area inside a building or structure, distal from a perimeter of the building or structure, that interferes with the GPS signal such that no GPS signal is detectable.

Example 15: A system comprising:
  a memory; and
  a processor configured to execute instructions in the memory to perform the method of any one of the preceding examples.

Example 16: A method performed by an electronic device, for indoor-outdoor detection of the electronic device, the method comprising:
  performing a scan for wireless networks in range of the electronic device;
  detecting a plurality of location-related signals using sensors of the electronic device;
  identifying, based on a result of the scan, a plurality of access points providing wireless-network access;
  transmitting the plurality of location-related signals and a list of the identified access points to a server;
  receiving, from the server, information corresponding to each of the identified access points, the received information corresponding to crowdsourced signals collected at the server from a plurality of electronic devices that observed the identified access points, the received information including:
    an indication of a percentage of detections of a respective identified access point in the crowdsourced signals that are accompanied by a GPS signal; and
    a received signal strength, RSS, value below which the detections of the respective identified access point are not accompanied by a GPS signal; and
  determining, based on the received information, in which location of an outdoor location, a light-indoor location, or a deep-indoor location the electronic device was most-likely located when the electronic device performed the scan.

Example 17: The method as described in Example 16, further comprising, based on the received information, determining a probability, for the respective identified access point, indicating that the respective identified access point is located deep indoors.

Example 18: The method as described in Example 17, wherein the determining in which location the electronic device was most-likely located when the electronic device performed the scan includes calculating, based on a combination of probabilities of the identified access points, an additional probability indicating a likelihood that the electronic device was located deep indoors when the electronic device performed the scan.

Example 19: The method as described in Example 18, further comprising applying multiple threshold values to the additional probability to define ranges corresponding to the outdoor location, the light-indoor location, and the deep-indoor location, respectively.

Example 20: The method as described in Example 17, further comprising: fusing the percentage and the RSS value for each of the identified access points; and computing a probability that the scan was performed at a deep-indoor location.

Example 21: The method as described in Example 16, wherein the location-related signals include at least one of a GPS position of the electronic device, barometric pressure, inertial signals, ambient light, ambient temperature, or Wi-Fi signals.

Example 22: The method as described in Example 16, wherein receiving information from the server includes receiving a subset of the crowdsourced signals in raw form.

Example 23: The method as described in Example 16, further comprising:
  responsive to the determining, triggering a function corresponding to the determined location.

Example 24: The method as described in Example 23, wherein:
  the determined location includes the light-indoor location or the deep-indoor location; and
  the triggered function comprises turning GPS off for location detection.

Example 25: The method as described in Example 23, wherein:
  the triggered function comprises switching an augmented-reality application from a first mode to a second mode based on the determined location being different than a previously determined location of the electronic device.

Example 26: The method as described in Example 25, wherein:
  the determined location is the light-indoor location and the previously determined location is the outdoor location; and
  the first mode comprises a three-dimensional mode and the second mode comprises a two-dimensional mode.

Example 27: The method as described in Example 16, wherein:
  the received information includes a probability, computed by the server based on the crowdsourced information, that a respective identified access point is located deep indoors; and
  the determining is based on a combination of received probabilities for the identified access points and one or more probability threshold values.

Example 28: The method as described in Example 27, wherein the one or more probability threshold values include application-specific values.

Example 29: The method as described in Example 27, wherein the one or more probability threshold values are specific to an operating system of the electronic device.

Example 30: The method as described in Example 27, wherein the one or more probability threshold values are definable by a user of the electronic device.

Example 31: An electronic device comprising:
  a memory; and
  a processor configured to execute instructions in the memory to perform the method described in of any one of examples 16 through 30.

CONCLUSION

Although aspects of the client-server approach for indoor-outdoor detection of an electronic device, and associated systems and methods have been described in language specific to features and/or methods, the subject of the appended claims is not necessarily limited to the specific features or methods described. Rather, the specific features and methods are disclosed as example implementations of the client-server approach for indoor-outdoor detection of an electronic device, and associated systems and methods, and other equivalent features and methods are intended to be within the scope of the appended claims. Further, various different aspects are described, and it is to be appreciated that each described aspect can be implemented independently or in connection with one or more other described aspects.

What is claimed is:

1. A method, performed by a server, for indoor-outdoor detection of an electronic device, the method comprising:
receiving a request from an electronic device for location information corresponding to access points detected in range of the electronic device and identified in the request, the request including sensor data detected by the electronic device at a location of the electronic device;
accessing, in response to receiving the request, stored crowdsourced signals, including access-point detections and corresponding sensor data previously received from a plurality of electronic devices that observed a plurality of access points, the accessing to locate a subset of the stored crowdsourced signals that correspond to the access points identified in the request;
determining, based on the stored crowdsourced signals and per access point identified in the request, a percentage of detections of the access point that are accompanied by a global positioning system, GPS, signal of a device that detected the access point;
determining, based on the stored crowdsourced signals and per access point identified in the request, a received signal strength, RSS, value below which no GPS signal accompanies the detections of the access point; and
transmitting the percentage and the RSS value, per access point identified in the request, to the electronic device to enable the electronic device to determine if the location of the electronic device is an outdoor location or an indoor location and trigger a corresponding function.

2. The method as recited in claim 1, wherein the transmitting includes transmitting the subset of the crowdsourced signals in raw form to the electronic device to enable the electronic device to use application-specific parameters or system-specific parameters for distinguishing whether the location of the electronic device is the outdoor location or the indoor location.

3. The method as recited in claim 1, wherein the sensor data includes at least one of a GPS position corresponding to the location of the electronic device, barometric pressure, inertial signals corresponding to the electronic device, ambient light, ambient temperature, or Wi-Fi signals.

4. The method as recited in claim 1, further comprising aggregating the sensor data with the stored crowdsourced signals.

5. The method as recited in claim 1, wherein the percentage indicates how many times other devices detected a GPS signal when observing the access point relative to a total number of detections of the access point in the stored crowdsourced signals, and wherein:
a high percentage indicates that the access point is likely outdoors;
a low percentage indicates that the access point is likely deep indoors; and
a moderate percentage indicates that the access point is likely lightly indoors.

6. The method as recited in claim 1, wherein the RSS value represents a minimum RSS value that is accompanied by a GPS signal of a device that detected the access point, the minimum RSS value relative to a total number of detections of the access point in the stored crowdsourced signals with corresponding RSS values.

7. The method as recited in claim 1, further comprising:
calculating, for a respective access point identified in the request, a probability indicating a likelihood that the respective access point is deep indoors; and
transmitting the probability of the respective access point to the electronic device.

8. The method as recited in claim 7, wherein the indoor location includes a light-indoor location and a deep-indoor location, the method further comprising:
determining, based on a combination of computed probabilities for the identified access points, an additional probability indicating a likelihood that the location of the electronic device is the deep-indoor location; and
determining that the location of the electronic device is:
the outdoor location if the additional probability is less than a first threshold value;
the light-indoor location if the additional probability is between the first threshold value and a second threshold value that is greater than the first threshold value; or
the deep-indoor location if the additional probability is greater than the second threshold value.

9. The method as recited in claim 1, further comprising:
calculating, for a respective access point identified in the request, a probability indicating a likelihood that the respective access point is outdoors; and
transmitting the probability of the respective access point to the electronic device.

10. The method as recited in claim 9, wherein the indoor location includes a light-indoor location and a deep-indoor location, the method further comprising:
determining, based on a combination of computed probabilities for the identified access points, an additional probability indicating a likelihood that the location of the electronic device is the outdoor location; and
determining that the location of the electronic device is:
the deep-indoor location if the additional probability is less than a first threshold value;
the light-indoor location if the additional probability is between the first threshold value and a second threshold value that is greater than the first threshold value; or
the outdoor location if the additional probability is greater than the second threshold value.

11. The method as recited in claim 1, wherein transmitting the probability of the respective access point to the electronic device enables the electronic device to trigger a function responsive to a determination of which of the deep-indoor location, the light-indoor location, or the outdoor location corresponds to the location of the electronic device.

12. The method as recited in claim 1, wherein the outdoor location is outside of a building or structure.

13. The method as recited in claim 1, wherein the light-indoor location is proximate to a perimeter of a building or structure that interferes with the GPS signal such that a signal strength of the GPS signal is low.

14. The method as recited in claim 1, wherein the deep-indoor location includes an area inside a building or structure, distal from a perimeter of the building or structure, that interferes with the GPS signal such that no GPS signal is detectable.

15. A system comprising:
a memory; and
a processor configured to execute instructions in the memory to:
receive a request from an electronic device for location information corresponding to access points detected in range of the electronic device and identified in the request, the request including sensor data detected by the electronic device at a location of the electronic device;
access, in response to receiving the request, stored crowdsourced signals, including access-point detections and corresponding sensor data previously received from a plurality of electronic devices that observed a plurality of access points, the accessing to locate a subset of the stored crowdsourced signals that correspond to the access points identified in the request;
determine, based on the stored crowdsourced signals and per access point identified in the request, a percentage of detections of the access point that are accompanied by a global positioning system, GPS, signal of a device that detected the access point;
determine, based on the stored crowdsourced signals and per access point identified in the request, a received signal strength, RSS, value below which no GPS signal accompanies the detections of the access point; and
transmit the percentage and the RSS value, per access point identified in the request, to the electronic device to enable the electronic device to determine if the location of the electronic device is an outdoor location or an indoor location and trigger a corresponding function.

* * * * *